(12) United States Patent
Proksch

(10) Patent No.: US 7,543,931 B2
(45) Date of Patent: Jun. 9, 2009

(54) GLASSES FRAME

(76) Inventor: Wolfgang Proksch, Neuwiesenstrasse 11, Koenigsbach-Stein (DE) 75203

( * ) Notice: Subject to any disclaimer, the term of this patent is extended or adjusted under 35 U.S.C. 154(b) by 338 days.

(21) Appl. No.: 11/568,203

(22) PCT Filed: May 4, 2005

(86) PCT No.: PCT/DE2005/000834

§ 371 (c)(1),
(2), (4) Date: Oct. 23, 2006

(87) PCT Pub. No.: WO2005/109081

PCT Pub. Date: Nov. 17, 2005

(65) Prior Publication Data

US 2007/0211210 A1    Sep. 13, 2007

(30) Foreign Application Priority Data

May 6, 2004    (DE) .................. 20 2004 007 224 U

(51) Int. Cl.
*G02C 5/16* (2006.01)
*G02C 5/22* (2006.01)
(52) U.S. Cl. .......................... 351/113; 351/153; 16/228
(58) Field of Classification Search ................. 351/153, 351/140, 111, 116, 41, 158, 113; 16/228
See application file for complete search history.

(56) References Cited

U.S. PATENT DOCUMENTS

| 6,116,733 | A | 9/2000 | Krumme et al. |
| 6,260,965 | B1 | 7/2001 | Kroman et al. |
| 7,121,663 | B1 * | 10/2006 | Huang .................. 351/153 |
| 7,410,253 | B2 * | 8/2008 | Habermann ............. 351/153 |

FOREIGN PATENT DOCUMENTS

| EP | 0863424 B1 | 1/1997 |
| FR | 2815728 A1 | 4/2002 |

* cited by examiner

*Primary Examiner*—Hung X Dang
(74) *Attorney, Agent, or Firm*—David S. Safran; Roberts Mlotkowski Safran & Cole, P.C.

(57) ABSTRACT

A glasses frame having a first part for receiving lenses, and an arm that is respectively laterally connected to cheek ends on each side of the frame part in an articulated manner by a hinge. The arm has a first partial cylinder shell, on the end thereof facing the frame part, the cylindrical axis corresponding to the rotational axis of the hinge, and the first partial cylinder shell is applied, in a sliding manner, to a second partial cylinder shell provided on the frame part and forming a first sliding surface. The arm on the end facing the frame part has at least one spring tongue which is applied to a second sliding surface on the frame part in an elastic manner so that the region of the frame part having the second partial cylinder shell is elastically received between the first partial cylinder shell and the spring tongue.

17 Claims, 9 Drawing Sheets

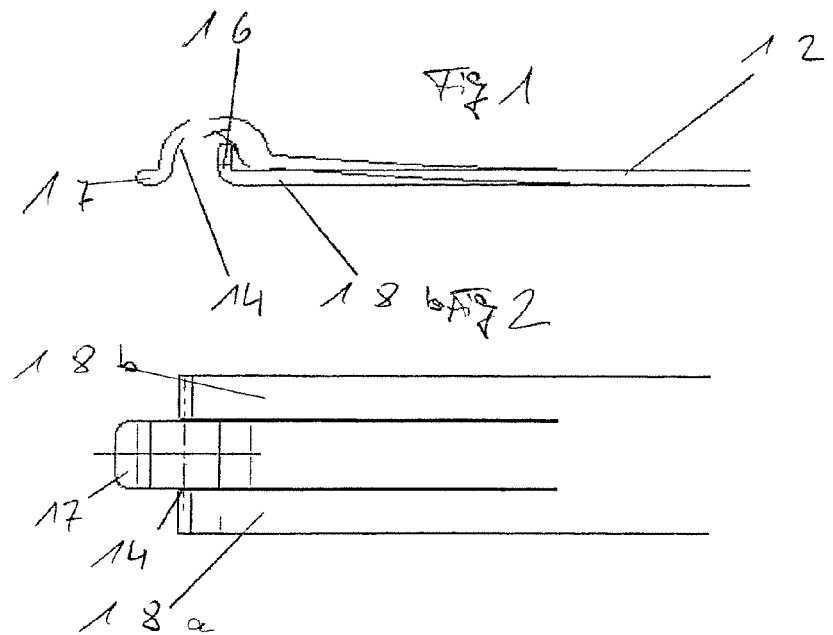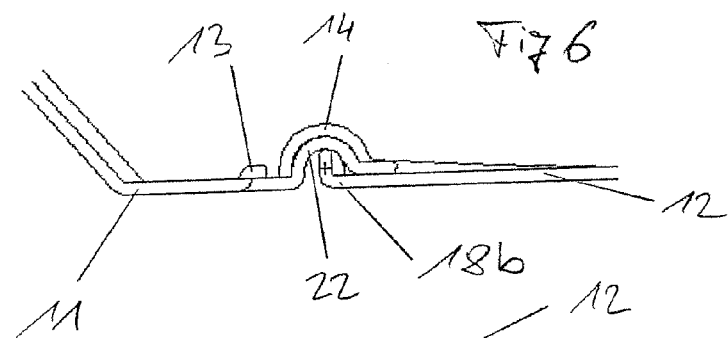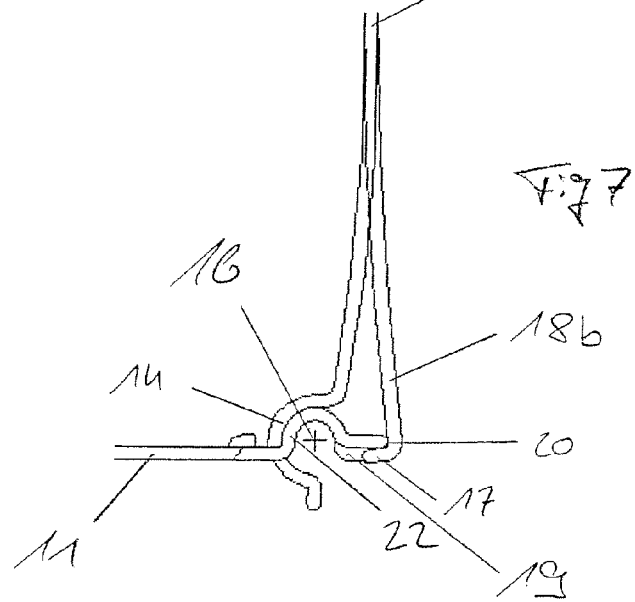

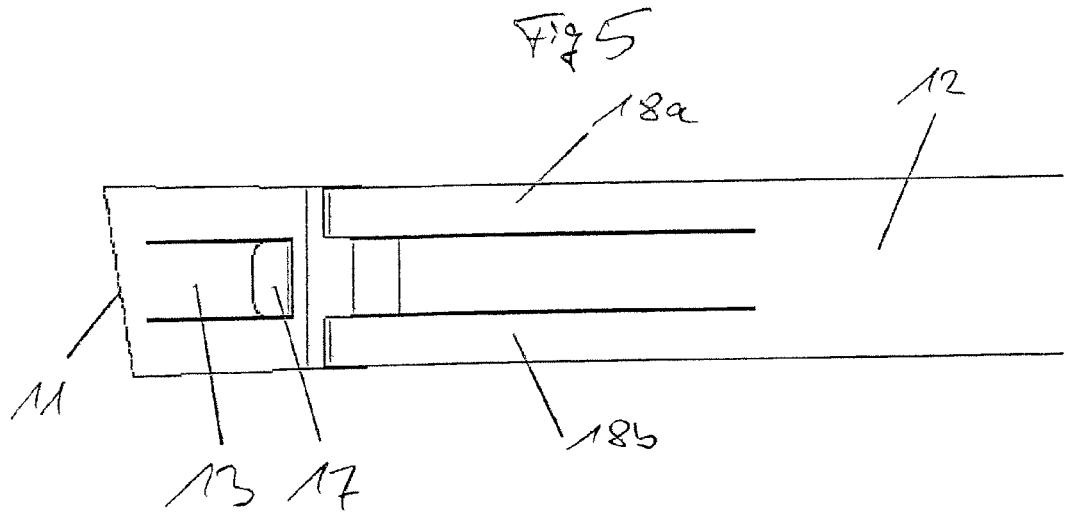
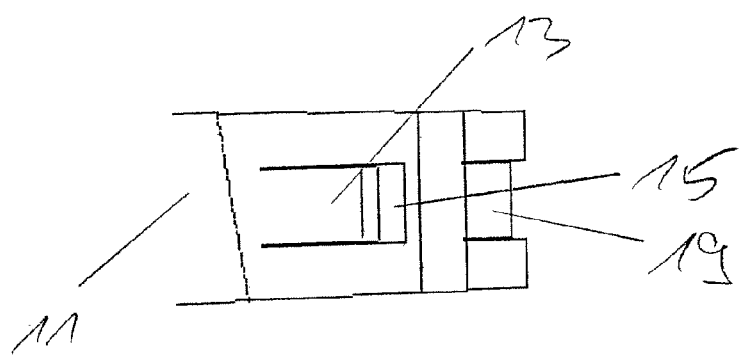
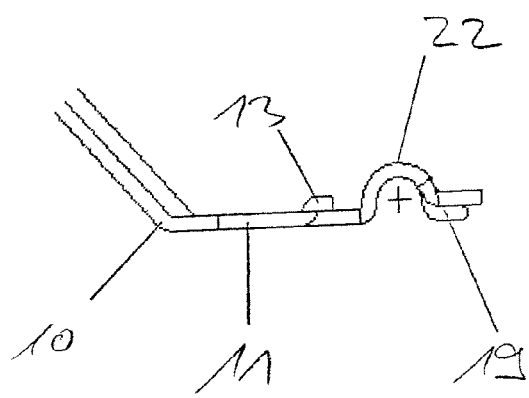

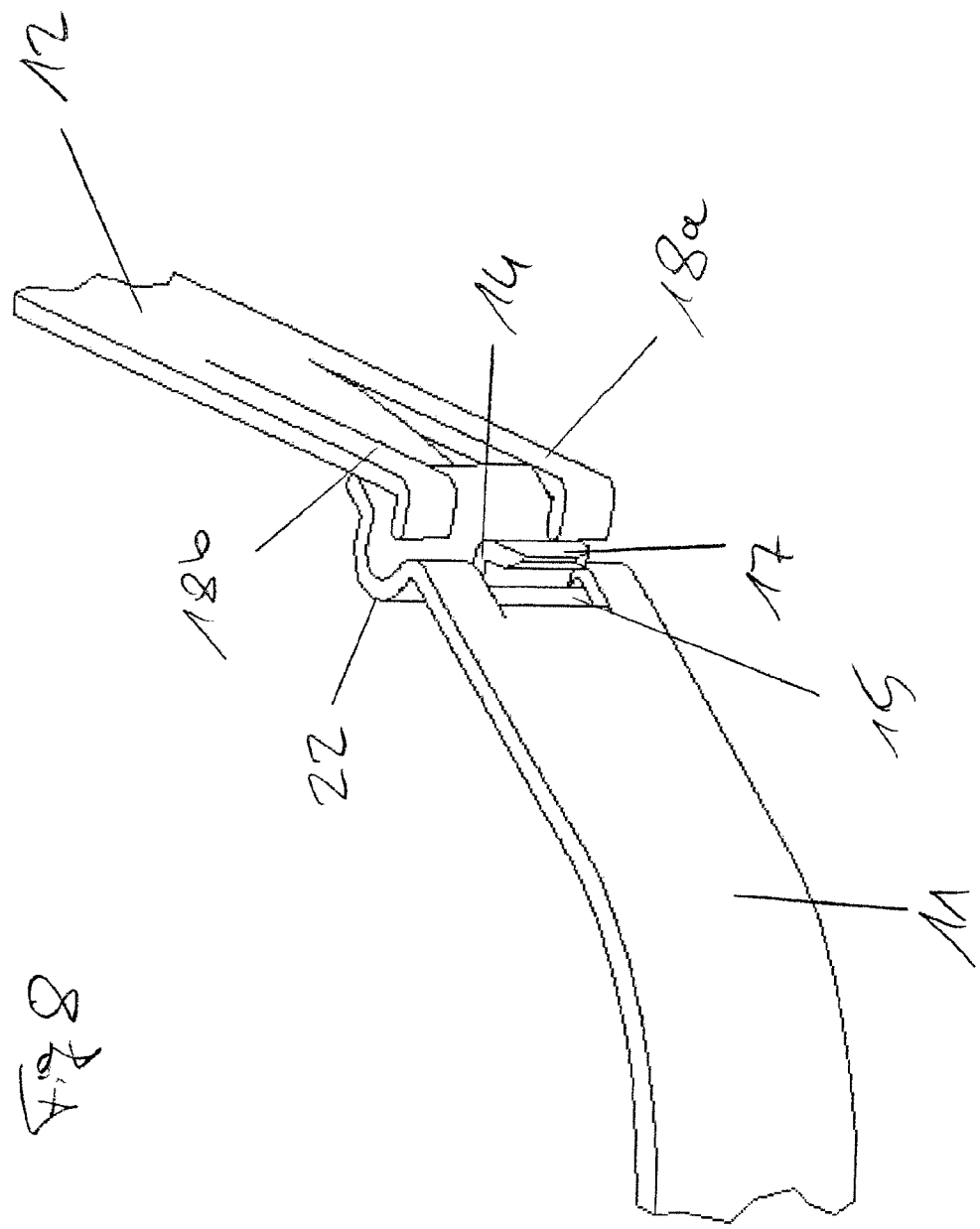

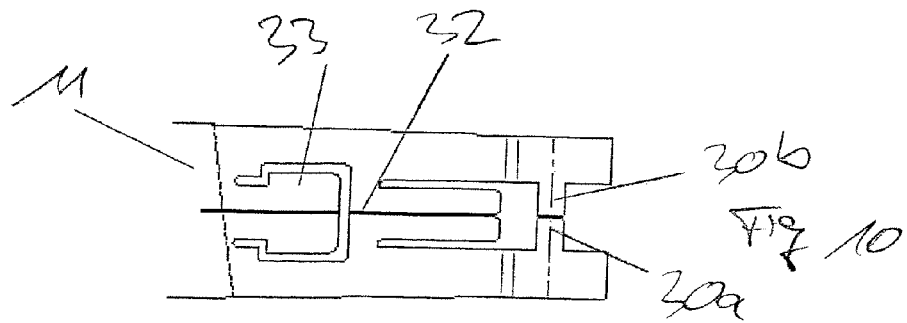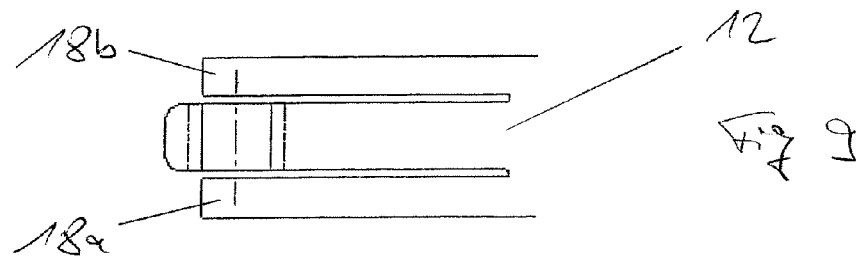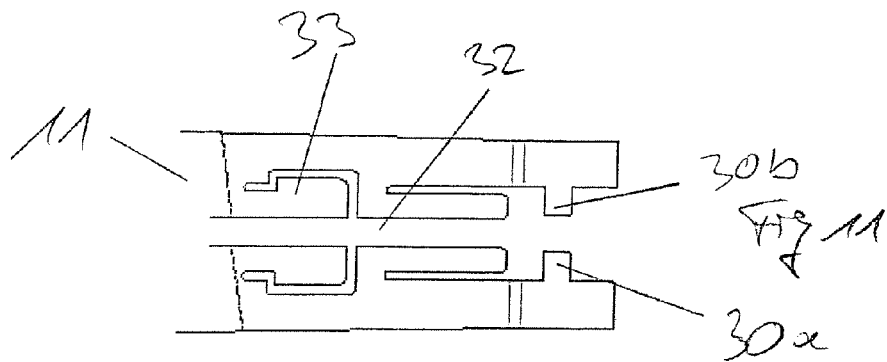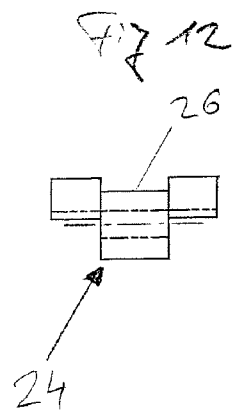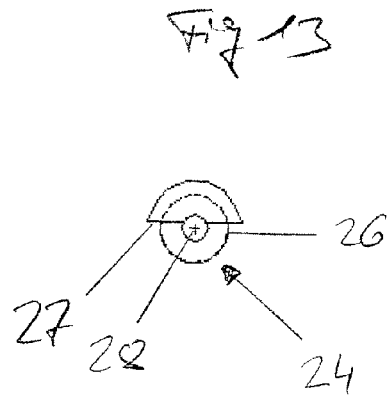

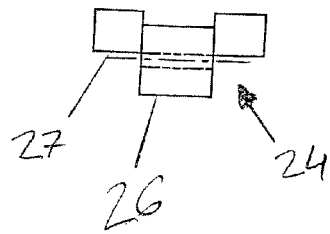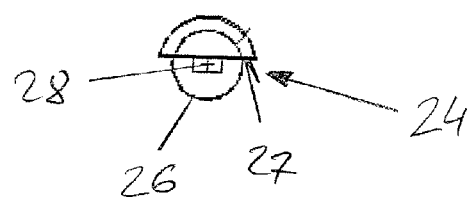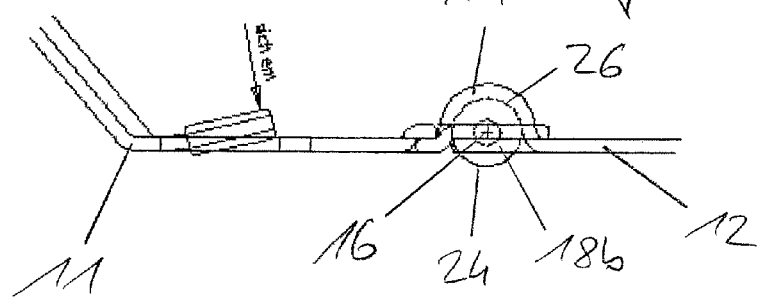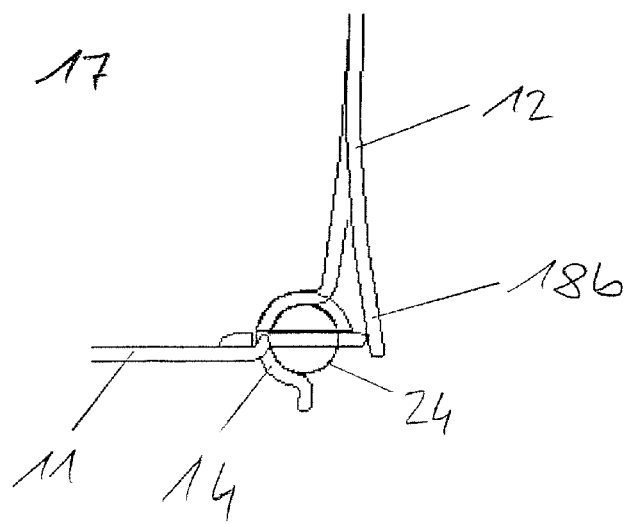

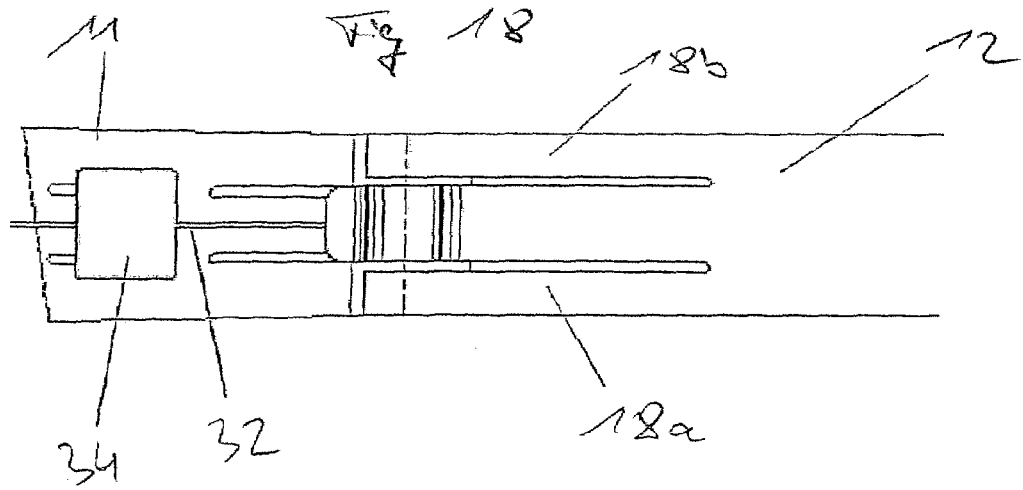
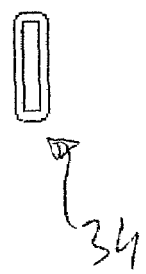
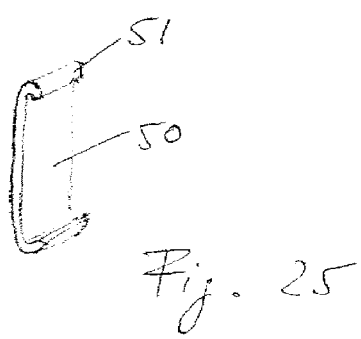

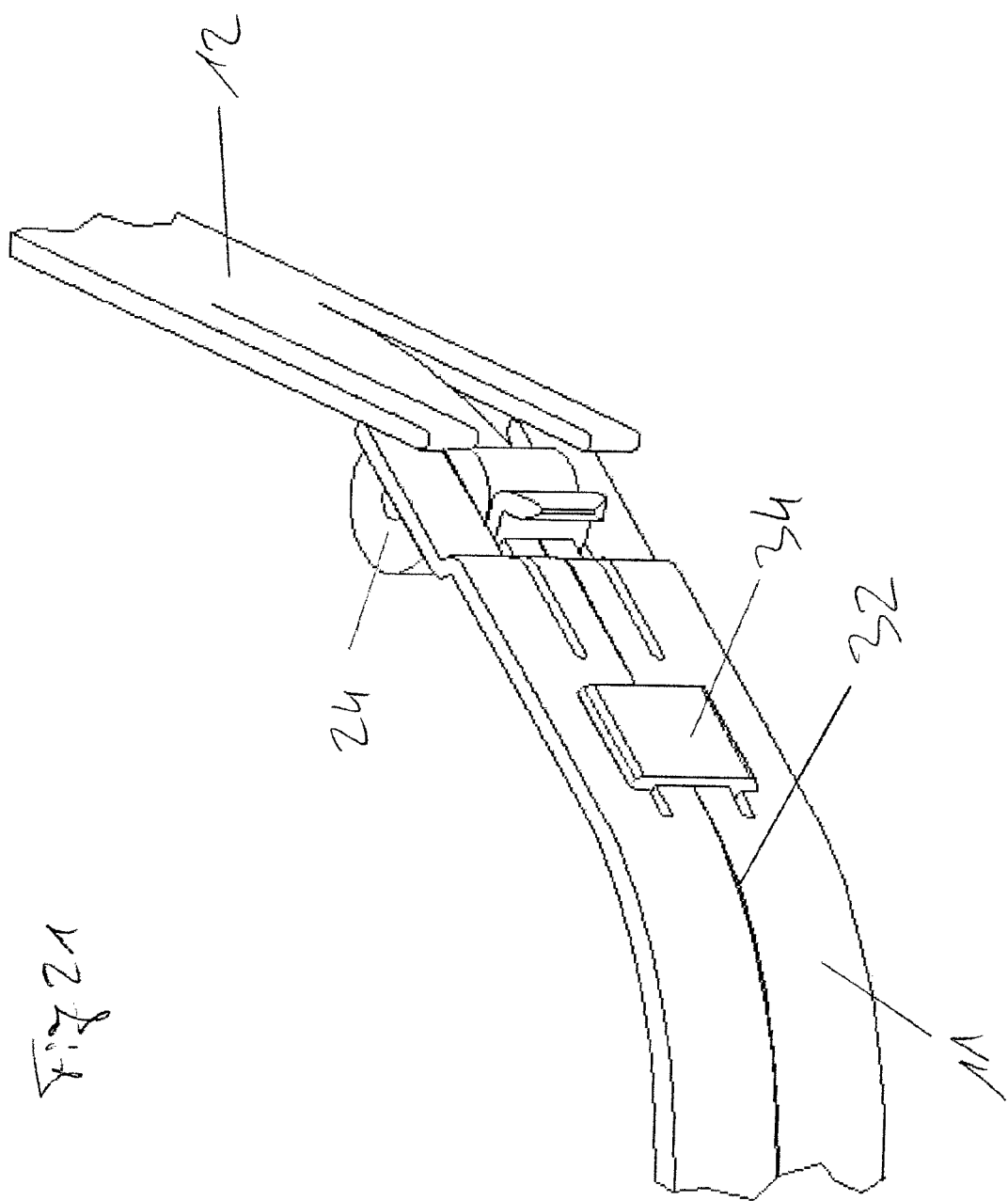

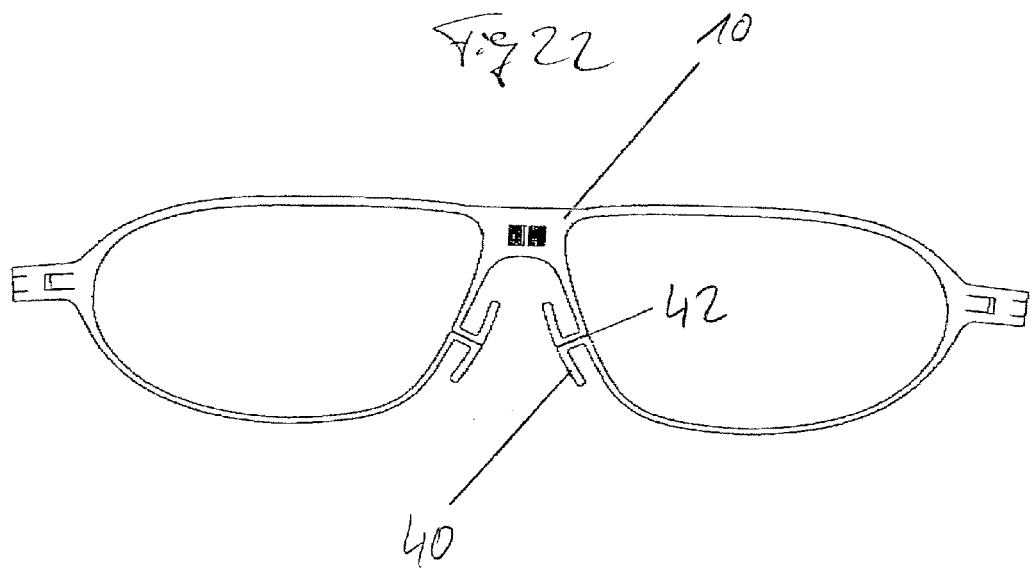
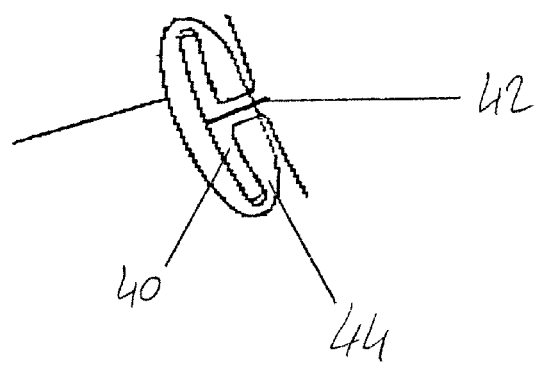

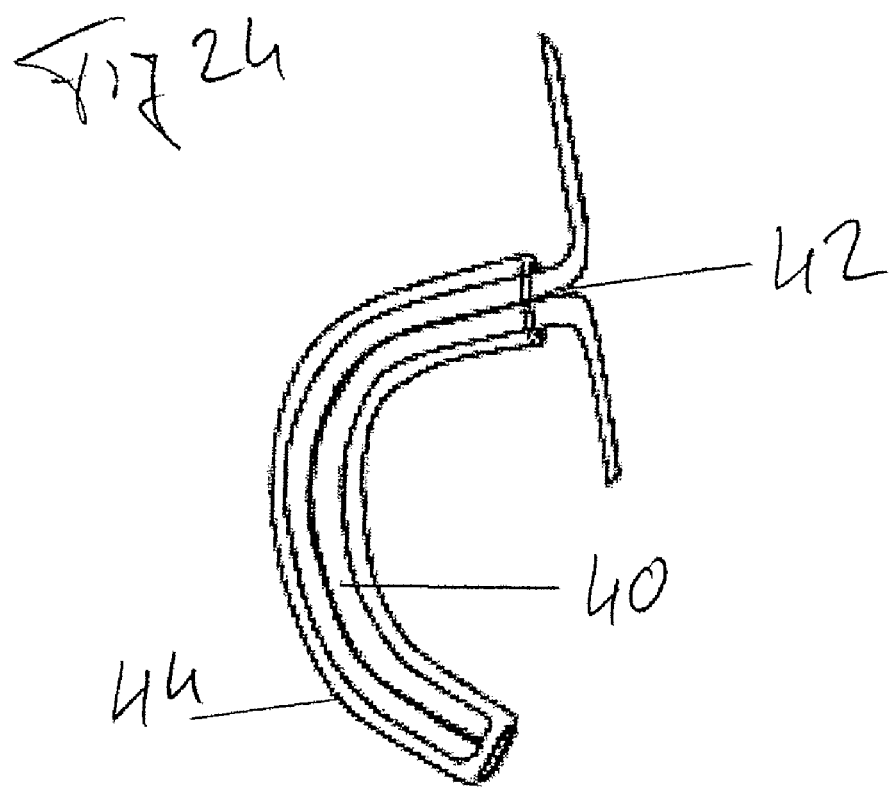

GLASSES FRAME

BACKGROUND OF THE INVENTION

1. Field of the Invention

The present invention relates to a glasses frame with a frame for receiving eyeglass lenses and with a temple piece on each side of the frame, which are coupled laterally to cheek ends of the frame by means of a hinge.

2. Description of Related Art

In such glasses frames usually both of the temple pieces are fixed at the frame of the eyeglasses by means of hinge screws or pins, wherein the screws or pins are coupled to openings at the glasses frame which have a circular cross-section. For example, the openings can be implemented as bores, which if necessary (when hinge screws are used) are provided with corresponding threads.

Other known glasses frames are designed without pins or hinge screws. For example, European Patent Application EP 0 863 424 B1 shows a glasses frame of this type wherein the temple piece comprises a notch at the end facing towards the frame and wherein, in the opened condition of the eyeglasses, a correspondingly formed frame bridge snaps into this notch. The thus formed connection between the temple piece and the glasses frame is fixed by a spring tongue of the temple piece as the spring tongue snaps into a corresponding opening at the glasses frame. Thus, this frame is a screwless three-pieces glasses frame having a spring-hinge system of the plug-in type that provides for a connection without pins or screws between the temple piece and the frame.

European Patent Application EP 1 023 626 B1 discloses a glasses frame, wherein likewise a glasses frame and a pair of temple pieces are connected by means of hinges that provide for a corresponding connection without pins or screws. In this case, the temple pieces are provided each with extensions at their ends facing the frame, which are wound up in a manner so that a tube is formed which engages into corresponding openings at the glasses frame. Additionally the tube is provided with a two-piece hinge core, which serves as a friction element when the eyeglasses are opened or shut.

SUMMARY OF THE INVENTION

It is an object of the present invention to provide a glasses frame of the type mentioned above, wherein a connection between the temple pieces and the framework is created, which provides for a more cost efficient fabrication while offering a good operating convenience.

According to the invention, in a glasses frame of the type mentioned above this object is solved in that the temple piece, at the end facing the frame, comprises a first partial cylinder shell with an approximately partial cylindrical surface in the form of a partial cylinder, wherein the cylinder axis corresponds to the rotational axis of the hinge and wherein the first partial cylinder shell rests slidingly on a second partial cylinder shell that is provided at the frame and defines a first sliding area. At the end facing the frame the temple piece comprises at least one spring tongue that rests elastically on a second sliding area on the frame, such that the region of the frame between the first partial cylinder shell and the spring tongue that defines the second partial cylinder shell is elastically received. A cylinder shell is meant to denote a convex outer surface or a concave inner surface of a cylinder, and a partial cylinder is meant to denote a cylinder that is cut open along its longitudinal axis, as a result of which a semi cylinder can be formed. Therefore, the glasses frame according to the invention, which for the formation of the hinge does not require hinge pins or screws, can be fabricated without expensive mounting steps. Because of the special design the glasses frame can be manufactured completely or at least in the region of the hinges from a flat material.

In a preferred embodiment of the invention the first cylinder shell is formed on the exterior side of the temple piece.

In other embodiments the first partial cylinder shell has a surface approximately in the shape of a partial cylinder with a cross-section of one third up to three quarters of a circle, and it can correspond to a semi cylinder for instance.

In especially preferred embodiments of the present invention the temple piece is produced of a flat material and especially of a metal sheet, which means that it can be produced for example by stamping, sawing or cutting from a metal band, and at the end facing the frame the temple has two longitudinal slots. Here these longitudinal slots divide the temple piece in three horizontal tabs, where at least one tab comprises a bulge that forms the partial cylinder shell or that is bend. At least one tab is designed as a spring tongue. In other preferred embodiments of the invention the frame at the cheek ends facing the temples can be formed as flat material, too, and can be bend, respectively, and it can comprise the above described partial cylinder shells in the form of bulges. Suitable materials that can be used for the fabrication of the frame and/or of the temple include especially all metals and noble metals that are technically workable as sheet metal, preferably stainless steel, titanium, beta-titanium and all thermosetting alloys.

Additionally, in a glasses frame according to the invention sliding elements can be attached at the frame at each of the cheek ends, the surfaces of which elements comprise the above mentioned second partial cylinder shells. These sliding elements can be formed unitary and they can comprise at least one cylindrical section, the surface of which represents at least partially the above mentioned partial cylinder shell. In this connection, the sliding elements comprise at least one supporting surface, with which they rest fixedly and not rotatable on the glasses frame. Additionally, the sliding elements can comprise at least one or more openings, that extend essentially parallel and coaxial to the mean perpendicular of the cylindrical section and that are connected with the frame by the engagement of securing pins mounted at the frame with these openings. The hinge elements can both be composed of plastics, for example produced by an injection-molding process, or of metal. In the case of a plastic part or an injection-molded plastic part, respectively, the openings of the sliding element preferably are formed rectangular, whereas in case they are made of metal the openings preferably have a round cross-section.

In order to insert the eyeglass lenses into the glasses frame, each of the openings for holding the two eyeglass lenses preferably comprises a radial slot that serves to elastically bend open the glasses frame and to again close it after having inserted the glasses. In preferred embodiments this slot can extend through mounts for nose pads at the frame. For the insertion of the glasses the opening of the frame can then be bend open, and afterwards the two halves of the nose pads can be closed again by means of corresponding slide-on nose pads, whereby a secure mounting of the glasses in the frame is provided for.

Alternatively, the slots of the openings can each pass through a cheek end of the glasses frame, whereby said end is divided in two parts and can to be bend open, and after the insertion of the glasses the end again can be closed by means of an attachable retainer. In preferred embodiments of this latter alternative essentially U-shaped securing tongues can be formed in the region of the cheek end, which are divided by the slot in two parts. After bending open the glasses frame and inserting the glasses, the securing tongues can be closed again by means of a slide-on retainer, by which also in this case it is guaranteed that the slot itself is fixedly closed and that the respective glasses each are secured within the opening of the frame.

Preferred embodiments of the present invention are described in more detail in the following description and with reference to the accompanying drawings.

BRIEF DESCRIPTION OF THE DRAWINGS

FIG. 1 is a top view of a temple piece of a glasses frame according to the invention;

FIG. 2 is a side view of the temple piece of FIG. 1;

FIG. 3 is a side view of a cheek end of a frame of the glasses frame according to the invention;

FIG. 4 is a top view of the cheek end of FIG. 3;

FIG. 5 is a side view of a glasses frame according to the invention, wherein a cheek end and a temple piece are shown in the assembled state;

FIG. 6 is a top partial view of the glasses frame of FIG. 5 with opened temple pieces;

FIG. 7 is a top view of the glasses frame of FIG. 6, where the glasses frame is shown with folded temples;

FIG. 8 is a perspective top view under an oblique angle of a glasses frame according to the invention, where a cutout with a cheek end and a part of a temple piece is shown;

FIG. 9 shows the end of a temple piece of a glasses frame with sliding elements;

FIGS. 10 and 11 are each side views of a cheek end of a glasses frame according to the invention with sliding elements;

FIG. 12 is a front view of a sliding element with a continuous round opening;

FIG. 13 is a top view of the sliding element of FIG. 12;

FIG. 14 is a front view of a sliding element with a rectangular opening;

FIG. 15 is a top view of the sliding element of FIG. 14;

FIG. 16 is a partial top view of a glasses frame in an assembled state with sliding elements, where the end of the frame, the cheek end and the corresponding end of the temple piece are shown;

FIG. 17 is a top view of the glasses frame of FIG. 16, where the eyeglasses are shown here with the temples being folded inwards;

FIG. 18 is a side view of the glasses frame of FIG. 16 in the opened condition;

FIGS. 19 and 20 are a top view and a side view, respectively, of a slide-on retainer;

FIG. 21 is a perspective partial view of a glasses frame with sliding elements showing the cheek end and the end of the temple piece facing the frame;

FIG. 22 is a front view of a glasses frame according to the invention;

FIG. 23 is a partial enlargement of the glasses frame of FIG. 22, wherein mounts for nose pads are shown with a nose pad slid thereon;

FIG. 24 shows an alternative embodiment of a mount for nose pads with a tubular nose pad slid thereon; and FIG. 25 is a view of an embodiment of a retaining clip.

DETAILED DESCRIPTION OF THE INVENTION

FIG. 1 shows a temple piece 12 that can be attached at a glasses frame in a preferred embodiment of the invention, such that it is rotatably hinged around an axis 16. At its end facing the frame the temple piece 12 is provided with spring tongues 18a and 18b, wherein in this top view only the spring tongue 18b can be seen. Additionally, at said end the temple piece 12 comprises a first partial cylinder shell 14 that is provided with a partial cylindrical surface that has approximately the form of a partial cylinder and corresponds in the illustrated case to the interior surface area of a half tube that would be created by cutting open a tube along its central axis. Such a temple piece can preferably be formed by stamping, etching or cutting the semi-finished from a flat metal band and then bending the partial cylinder shell 14. During this bending process a first stop 17 will be formed at the end of the partial cylinder shell 14 preferably, which stop, in the assembled condition of the eyeglasses, avoids that the temple piece is deflected further outwards beyond its opened position in which it forms an angle of about 90° with the glasses frame.

FIG. 2 shows the end of the temple piece 12 of FIG. 1 in a side view in which both spring tongues 18a and 18b are visible. In this view it also can be seen that the end of the temple piece 12 forms on its outside the spring tongues 18a and 18b by means of sawed or cut slots and that the middle tab carries the first partial cylinder shell 14.

FIGS. 3 and 4 show a cheek end 11 with a stop opening 15, which is partially filled up by a stop tongue 13. The function of this stop tongue 13 will be further explained below. Additionally, the cheek end is provided with a second stop 19 that is bent outwardly (i.e. out of the eyeglasses), the function of which stop will also be explained below.

FIG. 4 shows the cheek end 11 of FIG. 3 in a top view. As can be seen, the cheek end 11 is formed as a band and therefore it can be produced for example from a metallic flat band material. It can also be seen that the cheek end 11 comprises a second partial cylinder shell 22 that is formed in this case by a semi-cylindrical inward bend of the cheek end. Additionally, in this top view it can be seen that the stop tongue 13, that can be created for example by sawing or cutting at three of its sides from the cheek element 11, comprises at its end a fold that extends towards the inner side of the eyeglasses.

FIG. 5 shows eyeglasses with the cheek end 11 and the temple piece 12 of the preceding figures being in the assembled condition, wherein the eyeglasses are shown in the opened condition. In this side view the manner is shown, how the stop 17 of the temple piece 12 engages with the stop opening 15 of the cheek end 11 and abuts there at the stop tongue 13. In this manner it is avoided that the temple piece 12 is folded further to the outside as desired (in the illustration out of the plane; relative to the user away from the left half of his head). Because there is not only formed a stop opening 15 at the cheek end 11, but the stop tongue 13 is formed by corresponding slots, an elastic end position of the temple piece 12 instead of a sudden stop will be achieved, which improves the handling and wearing comfort of the eyeglasses.

In FIGS. 6 and 7 the corresponding section of the eyeglasses of FIG. 5 is shown in a top view. In FIG. 6 the eyeglasses are again shown as in FIG. 5 when being opened for use, so that the temple piece 12 is arranged approximately in a line with the cheek end 11. In FIG. 7 the temple piece 12 is folded, for example to pack away the eyeglasses. In the case of FIG. 6 the stop 17 of the temple piece 12 cannot be seen because it comes to a rest within stop opening 15 of the cheek end 11, but it can be seen that the stop tongue 13 is bent inwards at its end facing the temple piece 12, so that the stop 17 abuts in this position. In the opened condition of the eyeglasses the spring tongues 18a and 18b with the end facing the frame abut from behind against the second partial cylinder shell 22 of the cheek end 11, which is ensured by the fact that their ends are bend 90° inwardly. As can be seen in FIG. 6 by reference to the spring tongue 18b there a kind of tongs action is created by the spring tongue 18b and the first partial cylinder shell 14 of the temple piece 12, wherein these two elements embrace the second partial cylinder shell 22 of the cheek end 11 from outside and from inside. When starting from the opened condition according to FIG. 6 the two temple pieces of the eyeglasses are folded inwards to reach the folded condition according to FIG. 7, the second partial cylinder shell 22 of the cheek end 11 glides on the first partial cylinder shell 14 of the temple piece 12 on a first common sliding area, and the spring tongues 18a and 18b, due to their contact pressure on the cheek end, avoid separation of the cheek end and the temple piece.

In the folded condition of the eyeglasses that is partially shown in FIG. 7 from the top, it can be seen that during a folding operation the spring tongue 18b together with its stop 17 slides out from its first end position (in the opened condition of the eyeglasses) and then slides along a second sliding area 20, on which the tongue rests elastically on the frame, until it is brought into a second end position. In this opened position of the temple piece 12 the first stop 17 of the temple piece 12 abuts against the second stop 19 of the cheek end 11, whereby a slight resistance against opening is created. Therefore an accidental opening of the eyeglasses is avoided.

Additionally, it can be seen in FIGS. 6 and 7 that upon opening or folding shut of the eyeglasses the stop 17 along the second sliding area 20 with which it rests on the cheek end 11 is located in each opening condition relative to the supporting surface of the first partial cylinder shell 14 on the second partial cylinder shell 22 on the opposite side of the rotational axis 16. Therefore, it is taken care that in each position of this motion the first partial cylinder shell 14 of the temple 12 is pressed against the second partial cylinder shell 22 of the cheek end 11, while the connection between temple and cheek end is ensured.

In FIG. 8 the cheek end 11 and the temple 12 are shown in perspective view at an oblique angle from the top, wherein in this case the eyeglasses are not yet fully opened. Here, again the manner can be seen how the spring tongues 18a and 18b press against the back side of the second partial cylinder shell 22 of the cheek end 11, while on the other hand the first partial cylinder shell 14 of the temple piece 12 is guided around the second partial cylinder shell 22, whereby the two cylindrical are caused to rest on each other. Because in this case the eyeglasses, as was mentioned before, are not yet fully opened, the first stop 17 of the temple piece 12 has not yet arrived to fully rest within stop opening 15 of the cheek end 11 on the stop tongue 13.

In FIG. 9 an end of a temple piece 12 is shown as it can be used in a glasses frame with a sliding element. In this case, the elements of the temple piece 12 are shown to correspond to those of a temple piece which is to be used without a sliding element and as they are shown for example in FIG. 2. Therefore, the details will not be explained here further.

FIGS. 10 and 11 show as a corresponding counterpart to the temple piece of FIG. 9 a cheek end 11 that is provided for use of a sliding element. The cheek end 11 comprises a slot 32 that divides the cheek end 11 in two pieces and which extends (not shown in here) through the entire frame to the openings for holding eyeglass lenses or glasses. On one hand this slot 32 has the function that the frame can be bent open elastically (shown in FIG. 11), so that eyeglass lenses can be inserted into the corresponding openings. Of course this can also be realized with the above mentioned glasses frames without sliding elements. In the present case they have the additional function that by the bending open sliding elements can be inserted into the cheek end 11 and can be fixed there. For attaching a sliding element 24, which is explained subsequently with reference to FIGS. 12 and 14, the cheek end 11 is provided at its lower half, that is created by the slot 32, and also at its upper half each with a securing pin 30a and 30b respectively, which engage into a sliding element and therefore secure the same fixedly with the cheek end. Additionally, the cheek ends 11 of FIGS. 10 and 11 are provided with securing tongues 33 that are divided by the slot 32 in two parts and as a whole have a U-shaped appearance. These securing tongues can be produced by sawing, cutting or stamping them out of the cheek ends 11 at three edges corresponding to their shape. The function of these securing tongues is explained below.

FIGS. 12 and 14 each show a sliding element 24, which in the case of FIG. 12 is made of metal and which in the case of FIG. 14 is an injection-molded plastic part. With these views, it can be seen that these sliding elements have openings 28 that are formed each as continuous openings in these two embodiments shown, wherein the opening in the metal version of FIG. 12 has a circular cross-section and the opening in the injection-molded part of FIG. 14 has a rectangular cross-section together. The corresponding cross-sections are shown in FIGS. 13 and 14, which are top views of the sliding elements 24 of the FIGS. 12 and 14, respectively. The different cross-sectional shapes of the openings 28 result from the fabrication process, where for a metal sliding element the opening preferably is created by a bore, whereas for an injection-molded part the opening can also be rectangular, which is advantageous in that the sliding element 24 is protected better against rotation when inserted in a cheek end 11. Additionally, it can be seen in FIGS. 12 and 14 that a sliding element 24 is provided with a cylindrical section 26 located in the center of the sliding element, and with two supporting surfaces 27 at the corresponding ends of the sliding element. In the shown embodiments according to FIGS. 12 to 15, the supporting surfaces 27 are formed such that they are placed as partial cylinder sections on the middle cylindrical section 26, where the partial cylinder sections and the middle cylindrical section define a common axis that is in the center of the openings 28. Therefore, one can imagine a fabrication process where three cylinders, one of which has a smaller radius and the other two have a larger one, are stacked on each other such that the cylinder with the smaller radius is in the center. In a next step, a portion of both of the outer cylinders is cut away perpendicular to their face sides. The cuttings through both of the outer cylinders then represent each the parallel supporting surfaces 27 of the thus formed sliding element 24. The fabrication method just described is intended primarily to describe the shape of the sliding element, because more cost efficient processes can be applied, such as an injection-mold process, as was mentioned before.

FIGS. 16 and 17 show a glasses frame with a sliding element 24 in a top view, wherein in these views a cheek end 11 and an end of a temple piece 12 are shown in the assembled condition of the eyeglasses. In FIG. 16 the eyeglasses are shown in an opened condition and in FIG. 17 in a folded shut condition. While the temple piece 12 with the spring tongues 18a and 18b and with a first partial cylinder shell 14 corresponds essentially to a glasses frame without a sliding element, in this case the cheek end 11 has no directly molded second partial cylinder shell 22, rather the latter is replaced by the surface of the sliding element 24 or to be precise, by its cylindrical section 26, the surface of which forms the partial cylinder shell. That means that the sliding elements 24 are fixedly secured to the cheek ends 11 and that the first partial cylinder shell 14 of the temple piece 12 slides over the sliding element.

During fabrication or assembly of the eyeglasses the sliding element 24 is installed in the cheek end 11, by bending open the cheek end elastically along the slot 32. Then the sliding element is inserted such that the securing pins 30a and 30b (see FIG. 11) fix the sliding element, wherein both securing pins engage into the opening 28 and the supporting surfaces 27 come to a rest on the cheek end 11. Therefore it is assured that the sliding element 24 is connected fixedly and not rotatable with the cheek end 11. In FIG. 16 it can be seen that the cheek end 11 and the temple piece 12 are formed such that they form an essentially plane surface at the exterior side of the eyeglasses (when the eyeglasses are opened). Alternatively, the rotational axis 16 can be displaced further outwardly such that a round bulge is also visible at the outside. Then the first partial cylinder shell 14 projects for a smaller distance into the interior side of the eyeglasses. The same applies for the embodiment shown in the FIGS. 1 to 8.

FIG. 18 shows the glasses frame of FIGS. 16 and 17 in a side view, wherein the manner is visible in which an plug-on retainer 34 secures the cheek end 11 (and therefore the frame 10) that is divided in two parts by the slot 32, in that the two halves are secured fixedly together by means of plugging-on the retainer. Therefore, by removal of the retainer 34 the frame can be bend open elastically, for example to insert or to replace the glasses on the one hand and on the other hand to position the sliding element 24. In the FIGS. 19 and 20 retainer 34 is shown in a view along the cheek end 11 and in a side view (corresponding to FIG. 18), respectively. The retainer 34 is inserted in the cheek end 11 by bending the U-shaped securing tongue 33 (see FIG. 11) outwardly or inwardly, then the retainer is plugged-on and the elastic securing tongue springs back into its initial position. This is schematically shown in FIG. 16. Instead of retainer 34 which completely encompasses the securing tongue 33 there could be provided a retaining clip 50, which is illustrated in FIG. 25 and which is clipped onto the securing tongue 33 or onto the cheek end 11 of the frame in a manner that its spring tongues 51 encompass the edges of the tongue 33 or of the cheek end 11, respectively. If a retaining clip 50 is used that encompasses the cheek end 11, the securing tongue 33 of course need not to be provided.

FIG. 21 shows a perspective view of the glasses frame together with a sliding element 24 of FIGS. 16 and 17, wherein the eyeglasses are again shown in a condition in which the temple piece 12 is not yet fully pivoted outwardly to its end position.

FIG. 22 shows a glasses frame with a frame 10, in which the slots for bending open the openings for the eyeglass lenses are not cut through the cheek ends 11, as in the previously shown embodiments of the invention, but wherein in this embodiment they extend through mounts 40, so that they, as slots 42, divide these mounts in two pieces. That means that for the insertion of the glasses the glasses frame 10 can be bend open along slots 42, wherein the glasses frame after insertion of the glasses will be elastically reshaped, and the two-piece mounts 14 for the nose pads can be closed afterwards and therefore can be secured by the nose pads 44 according to FIG. 23. This alternative is used preferably together with glasses frames without sliding elements.

FIG. 24 shows an alternative embodiment to FIG. 23 with a mount for nose pads with hook-like mounts 40, on which after insertion of the glasses the tubular nose pads 44 can be plugged-on. The mounts 40 can be adapted to the shape of the nose by bending.

What is claimed is:

1. A glasses frame with a frame (10) for holding eyeglass lenses and with temple pieces (12) on each side of the frame, which are coupled laterally to cheek ends (11) of the frame by means of a hinge, characterized in that:

the temple piece, at the end facing to the frame, comprises a first partial cylinder shell (14), wherein the cylinder axis corresponds to the rotational axis (16) of the hinge, and the first partial cylinder shell rests slidingly on a second partial cylinder shell (22) that is provided at the frame and defines a first sliding area, and the temple piece, at the end facing the frame, comprises at least one spring tongue (18a, 18b), which rests elastically on a second sliding area (20) on the frame, such that the region of the frame between the first partial cylinder shell and the spring tongue which defines the second partial cylinder shell is elastically received.

2. The glasses frame as defined in claim 1, characterized in that the first partial cylinder shell (14) is located on the exterior side of the temple piece (12).

3. The glasses frame as defined in claim 1, characterized in that the first partial cylinder shell (14) comprises a cross-section that corresponds to one third up to three-quarters of a circle.

4. The glasses frame as defined in claim 1, characterized in that the first partial cylinder (14) comprises an approximately semi-cylindrical surface.

5. The glasses frame as defined in claim 1, characterized in that the temple (12) consists of a flat material that, at the end facing the frame, is divided into three tabs by two longitudinal slots, wherein at least one tab has a bulge which defines the first partial cylinder shell, and wherein at least one tab is said spring tongue (18a, 18b).

6. The glasses frame as defined in claim 1, characterized in that the frame (10) at the cheek ends (11) facing the temple is formed of a flat material and comprises the second partial cylinder shell (22) in form of a bulge.

7. The glasses frame as defined in claim 1, characterized in that a sliding element (24) is provided at each cheek end (11) of the frame (10), wherein the surface of said sliding element (24) comprises the second partial cylinder shell (22).

8. The glasses frame as defined in claim 7, characterized in that the sliding element (24) is formed in one piece and comprises at least one preferably cylindrical section (26), the surface of which defines the second partial cylinder shell (22), and additionally at least one supporting surface (27), with which the sliding element rests fixedly at the frame (10).

9. The glasses frame as defined in claim 8, characterized in that the sliding element (24) comprises at least one opening (28) that extends essentially coaxial to the mean perpendicular of the cylindrical section (26), and that the frame (10) further comprises at least one securing pin (30a, 30b) engaging into the opening to connect the sliding element to the frame.

10. The glasses frame as defined in claim 9, characterized in that the sliding element (24) is an injection-molded plastic part.

11. The glasses frame as defined in claim 10, characterized in that the opening (28) has a rectangular cross-section.

12. The glasses frame as defined in claim 9, characterized in that the sliding element (24) is made of metal.

13. The glasses frame as defined in claim 12, characterized in that the opening (28) has a round cross-section.

14. The glasses frame as defined in claim 1, characterized in that the frame (10) comprises two openings for holding the eyeglass lenses and additionally one closeable slot (32, 42) in the region of each of the openings, which slot extends essentially radially with respect to the opening, so that the openings can be bend open for insertion of the eyeglass lenses.

15. The glasses frame as defined in claim 14, characterized in that mounts (40) for nose pads (44) are provided at the frame, and that the slots (42), which can be closed by means of the plug-on nose pads, extend through these mounts.

16. The glasses frame as defined in claim 14, characterized in that the slots (32) extend from the openings each through a cheek end (11), subdividing said cheek end (11) in two parts, and that both of these halves can be connected with each other by means of a plug-on retainer (34).

17. The glasses frame as defined in claim 16, characterized in that there is provided in the region of the cheek end (11) an essentially U-shaped securing tongue (32) which the slot (32) divides in two parts and the two halves of which can be connected with each other by means of a plug-on retainer (34).

* * * * *